No. 766,131.

Patented July 26, 1904.

UNITED STATES PATENT OFFICE.

HERBERT B. ATHA, OF EAST ORANGE, NEW JERSEY.

TREATING SCRAP-STEEL AND RECARBURIZING SAME.

SPECIFICATION forming part of Letters Patent No. 766,131, dated July 26, 1904.

Original application filed January 18, 1904, Serial No. 189,606. Divided and this application filed March 10, 1904. Serial No. 197,466. (No specimens.)

*To all whom it may concern:*

Be it known that I, HERBERT BURR ATHA, residing at East Orange, in the county of Essex and State of New Jersey, have invented certain new and useful Improvements in Treating Scrap-Steel and Recarburizing the Same, of which the following is a full, clear, and exact description, such as will enable others skilled in the art to which it appertains to make and use the same.

My invention relates to certain improvements in recarburizing scrap-steel containing a small amount of carbon and also to the product resulting from said process.

Scrap-steel containing a small amount of carbon cannot be converted into a high-grade commercial steel without recarburizing in a furnace. Various attempts have been made to do this, one by putting coke into the furnace with the steel and another by putting pig-iron into the furnace with the scrap-steel. The first method has been found to be unsatisfactory, because the carbon in the coke was driven off before the steel scrap was heated to a temperature sufficiently high to absorb the carbon in the coke. The process of using pig-iron in the furnace with the scrap is successful; but it is more expensive than my present process. Other attempts have been found to be unsatisfactory for various reasons.

One of the objects of my invention is to recarburize scrap-steel and to produce therefrom a high-grade commercial steel in an efficient and cheap manner.

Another object is to prepare the scrap-steel before placing it in the furnace so that it can be easily and cheaply handled.

Other objects will appear from the hereinafter description.

My present invention was originally set forth in a pending application for Letters Patent which was filed by me in the United States Patent Office on or about January 18, 1904, Serial No. 189,606, this application and the invention covered thereby being divided out of that application upon the requirement of division.

In carrying out my present invention I prepare the carbon by finely dividing or pulverizing it and then putting this finely-divided carbon in a liquid. I keep the carbon thoroughly stirred and mixed in the liquid. I then place the scrap-steel in the liquid and let it remain for a certain length of time, when the carbon will adhere to the surface of the scrap, and when the scrap is removed from the liquid it will remain thereon, forming in some instances a film or coating of carbon practically over the whole surface of scrap. The scrap, with the carbon adhering or attached thereto, may now be pressed into cubes or bundles, when it can be readily put into an open-hearth furnace.

In some cases the bundles may be first formed or pressed into cubes and then placed in a tank or vessel containing the liquid. The liquid will then permeate the bundles and the carbon will be deposited on the pieces of scrap forming the bundles. The bundles of scrap-steel so prepared and having the particles of carbon intimately mixed therein are now placed in an open-hearth furnace. As the carbon is thus intimately mixed with the scrap-steel in the bundles, it will not be driven off before the temperature of the scrap is raised sufficiently high to absorb the carbon. The carbon is therefore not driven off, but substantially all of it is absorbed by the steel, it being a well-known fact that steel when raised to a certain temperature will act as a sponge to absorb the carbon coming in contact with it.

By my process as here described I recarburize steel at less expense than has heretofore been done, and the product is a high-grade commercial steel of uniform quality throughout. The scrap-steel prepared as I have described is found to be an excellent substitute for pig-iron to be used in an open-hearth furnace and is as easily handled as pig-iron and much less expensive.

While I have set forth a certain process for carrying out my invention, I do not wish it to be understood as being limited to the exact thing described. It is apparent that the carbon liquid may be placed in a tank and the carbon applied by placing the scrap in the tank containing the liquid, or the carbon may be applied to the scrap by spraying or sprinkling the carbon liquid on the scrap and permitting the liquid to evaporate, leaving the carbon adhering to the scrap, these and other apparent changes coming well within the scope of my invention.

In carrying out my process the liquid used may be ordinary water, or salt water, or molasses, or molasses-water, or oil. The fine pulverized carbon, as before stated, is thoroughly mixed with the liquid, so that when the carbon liquid is applied to the scrap the liquid or some part of it will evaporate, leaving the carbon adhering to the scrap.

Having described my invention, what I claim as new, and desire to secure by Letters Patent, is—

1. The herein-described process for preparing scrap-steel for remelting or recarburizing in an open-hearth furnace, which consists in applying to the surface of the scrap, a carbon-bearing liquid.

2. The herein-described process for preparing scrap-steel for remelting in an open-hearth furnace, which consists in applying to the scrap, a carbon-bearing liquid and pressing the scrap so treated into bundles.

3. The herein-described process for treating scrap-steel for remelting in an open-hearth furnace, which consists in mixing the finely-divided carbon in a liquid, placing the scrap-steel in the carbon-bearing liquid where the carbon will adhere to the scrap, and then removing the scrap from the liquid.

4. The herein-described process for treating scrap-steel for remelting in an open-hearth furnace, which consists in mixing finely-divided carbon in a liquid and placing the scrap-steel in the carbon-bearing liquid where the carbon will adhere to the scrap, then removing the scrap from the liquid and pressing the scrap having the carbon adhering to the surface thereof into bundles.

5. The herein-described process for treating scrap-steel for remelting in an open-hearth furnace, which consists in mixing finely-divided carbon in a liquid, placing the scrap-steel in the carbon-bearing liquid where the carbon will adhere to the scrap, removing the scrap from the liquid, putting the scrap with the carbon adhering thereto in an open-hearth furnace, and raising the temperature of the furnace to such a point that the scrap-steel will absorb the carbon.

6. The herein-described process of recarburizing scrap-steel, which consists in placing finely-divided carbon in a liquid, placing scrap-steel into the liquid where a coating of carbon will be formed on the surface of the scrap, removing the scrap containing thereon a coating of carbon-bearing liquid, pressing the mixture into bundles, placing the bundles into an open-hearth furnace and raising the temperature of the furnace to such a point that the steel scrap will absorb the carbon.

7. As a new and improved product, a bundle of scrap-steel having on the surface of the different pieces of the scrap forming the bundle a film of finely-divided carbon, said film being formed by applying a carbon-bearing liquid to the pieces of scrap.

8. As a new and improved product, pieces of scrap-steel having on the surface thereof a film of finely-divided carbon, said film being formed by applying a carbon-bearing liquid to the pieces of scrap, the said pieces of scrap being pressed together into a bundle.

9. As a new and improved product, a bundle of scrap-steel having on the surface of the different pieces of scrap forming the bundles particles of finely-divided carbon adhering thereto, said particles being applied by applying a carbon-bearing liquid to the scrap.

10. The hereinbefore-described process for preparing scrap-steel for remelting the liquid in an open-hearth furnace, which consists in applying to the surface of the scrap, a carbon-bearing liquid, evaporating the liquid and leaving the particles of carbon adhering to the scrap.

In testimony whereof I affix my signature in the presence of two witnesses.

HERBERT B. ATHA.

Witnesses:
  HELEN M. SEAMANS,
  L. B. STREVELL.